US 6,530,687 B1

(12) United States Patent
Suzuki et al.

(10) Patent No.: US 6,530,687 B1
(45) Date of Patent: Mar. 11, 2003

(54) TEMPERATURE MEASURING SYSTEM (75) Inventors: Tomohiro Suzuki, Yamanashi-Ken (JP); Shigeru Kasai, Yamanashi-Ken (JP); Masahiro Shimizu, Kofu (JP); Minoru Yazawa, Yamanashi-Ken (JP)

(73) Assignee: Tokyo Electron Limited, Tokyo-to (JP)

( * ) Notice: Subject to any disclaimer, the term of this patent is extended or adjusted under 35 U.S.C. 154(b) by 163 days.

(21) Appl. No.: 09/657,056

(22) Filed: Sep. 7, 2000

Related U.S. Application Data (63) Continuation of application No. PCT/JP00/02004, filed on Mar. 30, 2000.

(30) Foreign Application Priority Data

Mar. 30, 1999  (JP) ............................................. 11-090097

(51) Int. Cl.[7] .............................. G01J 1/08; G01J 1/24; G01J 1/32; G01J 5/06
(52) U.S. Cl. ........................................ 374/131; 374/126
(58) Field of Search ................................. 374/126, 128, 374/129, 130, 133, 121, 131, 141

(56) References Cited

U.S. PATENT DOCUMENTS

| | | | | |
|---|---|---|---|---|
| 4,919,542 A | * | 4/1990 | Nulman et al. ................. 374/9 |
| 4,956,538 A | * | 9/1990 | Moslehi ................... 219/121.6 |
| 5,061,084 A | * | 10/1991 | Thompson et al. .......... 374/127 |
| 5,156,461 A | * | 10/1992 | Moslehi et al. ............. 374/128 |
| 5,165,796 A | * | 11/1992 | Gat et al. .................... 374/127 |
| 5,226,732 A | * | 7/1993 | Nakos et al. ................ 374/133 |
| 5,308,161 A | * | 5/1994 | Stein ............................. 374/5 |
| 5,507,576 A | * | 4/1996 | Fally .......................... 374/127 |
| 5,628,564 A | * | 5/1997 | Nenyei et al. .............. 374/121 |
| 5,738,440 A | * | 4/1998 | O'Neill et al. ................. 374/9 |
| 5,743,643 A | * | 4/1998 | Gronet et al. ............... 374/121 |
| 5,822,222 A | * | 10/1998 | Kaplinsky et al. .......... 364/557 |
| 6,007,241 A | * | 12/1999 | Yam et al. ................... 374/131 |
| 6,056,434 A | * | 5/2000 | Champetier .................. 374/126 |
| 6,123,766 A | * | 9/2000 | Williams et al. ............... 117/85 |
| 6,127,658 A | * | 10/2000 | Kohav ......................... 219/390 |
| 6,151,446 A | * | 11/2000 | Hunter et al. ................ 392/416 |
| 6,160,242 A | * | 12/2000 | Guardado .................... 219/390 |
| 6,200,634 B1 | * | 3/2001 | Johnsgard et al. ........ 427/248.1 |
| 6,222,111 B1 | * | 4/2001 | Kern ........................... 136/201 |
| 6,350,969 B1 | * | 2/2002 | Boas et al. .................. 219/390 |
| 6,375,348 B1 | * | 4/2002 | Hebb et al. ..................... 374/9 |
| 2002/0020696 A1 | * | 2/2002 | Kitamura et al. ............ 219/390 |

FOREIGN PATENT DOCUMENTS

| | | | |
|---|---|---|---|
| EP | 0539984 A2 | * 5/1993 | ............ G02B/5/00 |
| JP | 60-131430 | 7/1985 | |
| JP | 4-305130 | 10/1992 | |
| JP | 5-264349 | 10/1993 | |
| JP | 7-283096 | 10/1995 | |
| JP | 9-198942 | 7/1997 | |
| JP | 10-170343 | 6/1998 | |
| JP | 10-227430 | 8/1998 | |

* cited by examiner

*Primary Examiner*—Diego Gutierrez
*Assistant Examiner*—Gail Verbitsky
(74) *Attorney, Agent, or Firm*—Finnegan, Henderson, Farabow, Garrett & Dunner LLP (57) ABSTRACT

The present invention aims to exclude the influence of stray light dye to a heating lamp when measuring the temperature of an object to be treated, such as a wafer, with the use of a radiation thermometer. The present invention utilizes the relationship between a power W supplied from an output control section 28 to lamps 22 and optical energy radiated from the lamps 22. Influence which the light radiated from the lamps 22 exerts on the output voltage of a photodiode 18 is experimentally found beforehand as a function of the power W, and stored in a computing section 26. The computing section 26 subtracts the influence of stray light from the lamps 22, which is included in the output voltage of the photodiode 18, from the output value of the photodiode 18 on the basis of the value of the power W transmitted from the output control section 28, and calculates the temperature of a susceptor 8.

6 Claims, 11 Drawing Sheets

TEMPERATURE MEASURING SYSTEM

CROSS REFERENCE TO RELATED APPLICATION

This application is a continuation of International Application No. PCT/JP00/02004, filed Mar. 30, 2000.

TECHNICAL FIELD

This invention relates to a technology for excluding the influence of stray light ascribed to lights generated by the lamp heater itself, when measuring the temperature of an object, which is heated by a lamp heater, by use of a radiation thermometer.

BACKGROUND OF THE INVENTION

In a film forming step, etc. in a semiconductor manufacturing process, it is common practice to heat a wafer, as a material to be treated, by a lamp heater via a susceptor or directly, in order to maintain the wafer at a designated temperature. In the film forming step, the temperature of the wafer greatly governs the film forming rate and the characteristics of the film. Thus, control of the wafer temperature is very important. As a method for detecting the wafer temperature, the technique of measuring thermal radiation from the wafer with a radiation thermometer has been known.

In this method, however, a light receiving element of the radiation thermometer simultaneously detects not only the thermal radiation from the wafer itself, but also radiated light from the lamp heating source, posing the problem that the S/N ratio of temperature measurement cannot be fully increased. As means for solving this problem, various techniques have been proposed, but no satisfactory methods have been found out.

SUMMARY OF THE INVENTION

The present invention has been accomplished in light of the above circumstances. A first object of the invention is to provide a temperature measuring system capable of making accurate temperature measurement.

A second object of the present invention is to attain the first object in a wide temperature range.

Furthermore, a third object of the present invention is to attain the first object without complicating the configuration of an apparatus.

To attain the above objects, the present invention claims a temperature measuring system for performing temperature measurement of an object to be measured, the object being housed in a chamber so as to be heated by a lamp heating source. The temperature measuring system includes: a photodetector that detects thermal radiant light from the object to be measured; and a computing section that calculates a temperature of the object to be measured, based on an output value of the photodetector, wherein an influence exerted on the output value of the photodetector, due to arrival of the light emitted by the lamp heater at the photo detector, is stored in the computing section as a function of an input power into the lamp heater, and wherein the computing section corrects the output value of the photodetector based on the function, and determines the temperature of the object, based on the corrected value.

DESCRIPTION OF THE PREFERRED EMBODIMENTS

Embodiments of the present invention will now be described with reference to the accompanying drawings.

First Embodiment

Figure 1:
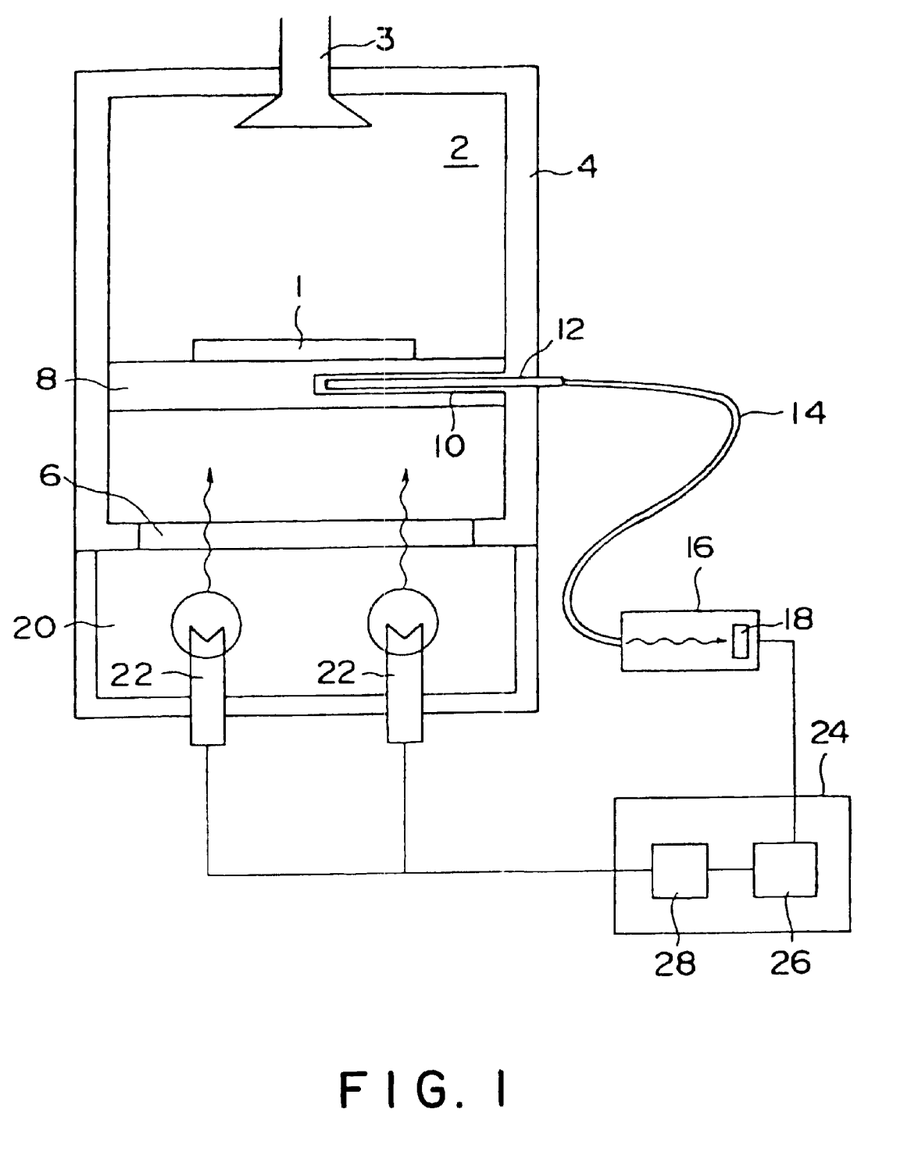
FIG. 1 is a view schematically showing the constitution of a CVD treating apparatus equipped with a temperature measuring system according to a first embodiment of the present invention.
Figure 2:
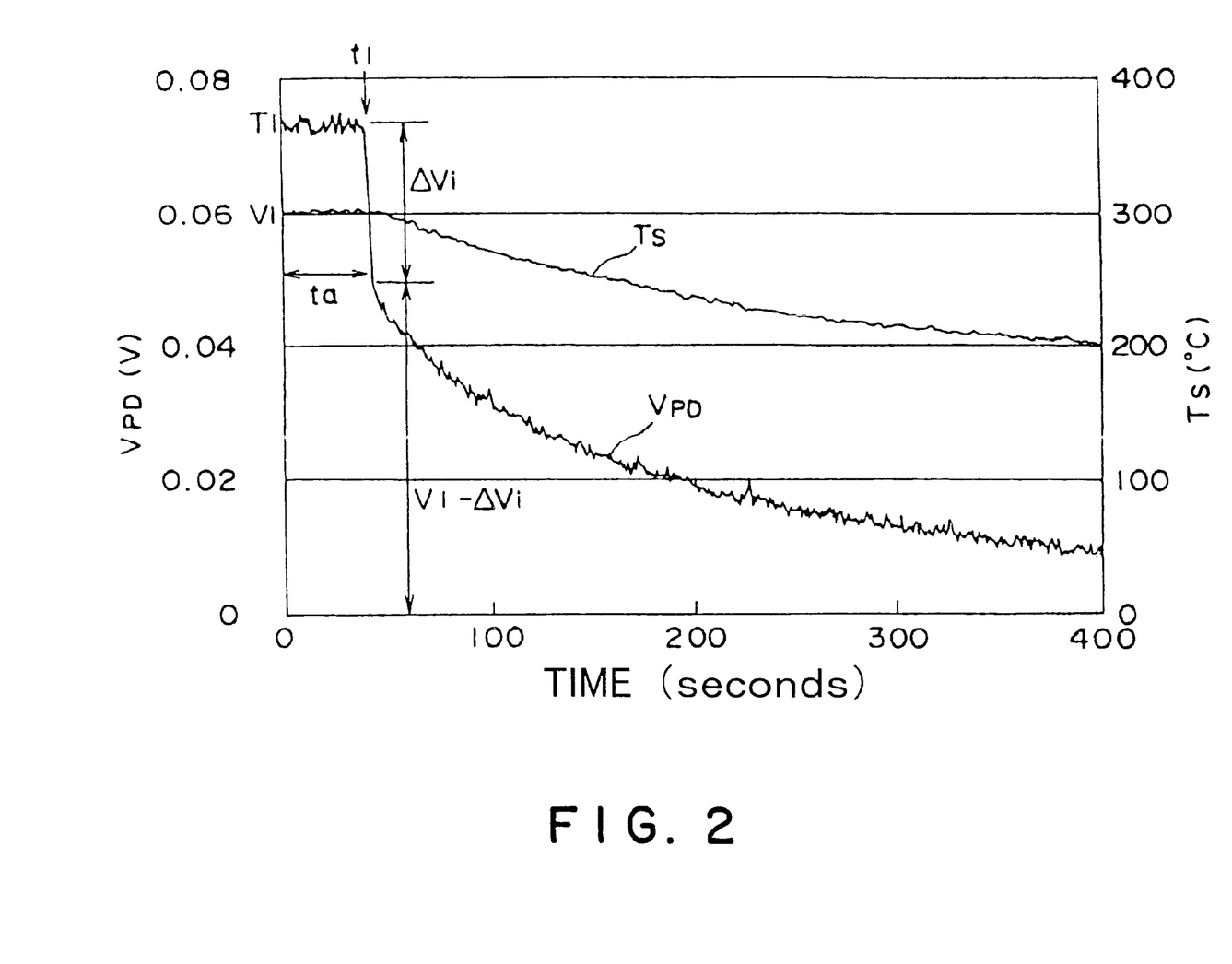
FIG. 2 is a graph illustrating a method for obtaining a correction function stored in a computing section.
Figure 3:
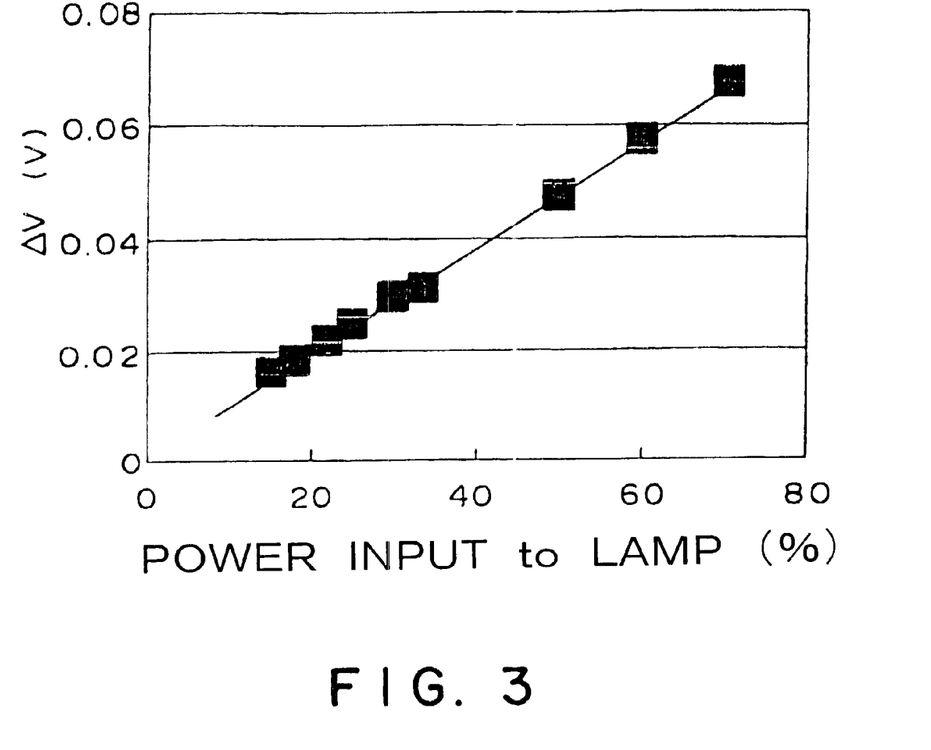
FIG. 3 is a graph showing an example of the correction function.

A first embodiment is described with reference to FIGS. 1 to 3. FIG. 1 is a view schematically showing a CVD treating apparatus equipped with a temperature measuring system according to the present invention.

As shown in FIG. 1, the CVD apparatus has a chamber 2. When CVD treatment, such as a film formation treatment, is to be performed for a wafer 1, an atmosphere within the chamber 2 is isolated from an atmosphere outside the chamber 2. The chamber 2 is defined by a wall 4. Provided at the bottom of the wall 4 is a window 6, which is made of quartz and is transparent to light. In the chamber 2, a plurality of members, e.g., a gas shower 3 for supplying a processing gas to the wafer 1, are provided. However, these members are not essential parts of the present invention, thus their details are not described herein.

A susceptor 8 on which the wafer 1, i.e., a material to be processed is provided in the chamber 2. The susceptor 8 is preferably formed of black AlN, and is thus advantageous in that the radiation characteristics of the susceptor 8 is close to that of a blackbody, and that the susceptor is minimally transparent to lamplight.

Formed in the susceptor 8 is a hole 10, which extends from a side surface of the susceptor toward a center of the susceptor and terminated at the center of the susceptor 8. Inserted in the hole 10 is a light guide 12, i.e., a light guiding body, which condenses radiant light from the susceptor 8. The light guide 12 passes through the wall 4 and extends outside of the chamber 2. This constitution in which the light guide 12 is inserted into the hole 10 is advantageous in that the radiation characteristics of the susceptor 8 are close to those of a blackbody, and in minimizing an amount of lamplight arriving at the light guide 12.

A photodetector 16 is connected to the light guide 12 via an optical fiber 14. The photodetector 16 has a photodiode 18 as a light receiving element. The photodiode 18 detects thermal radiant lights in a specific wavelength range transmitted from the light guide 12 via the optical fiber 14, and produces a voltage corresponding to the energy of the lights. The restriction of the wavelength of light entered into the photodiode 18 can be achieved by use of a light receiving element with high sensitivity to the specific wavelength range, or by inserting an optical filter, which allows passage of lights only in a predetermined wavelengths range, ahead of the photodiode 18 in addition to the use of the light receiving element.

Provided below the chamber 2 is a lamp room 20. In the lamp room 20, lamps 22, i.e., a lamp heater, are provided. Light radiated by the lamps 22 passes through the window 6 of quartz, reaching the susceptor 8 and heating the susceptor 8.

A temperature controller 24 is connected to a radiation thermometer 16. The temperature controller 24 has a computing section 26 that calculates the temperature of the susceptor 8 based on the principle of Planck's radiation law, and an output control section 28 that controls an electric power to be supplied to the lamps 22 based on the temperature of the susceptor 8 calculated by the computing section 26.

Next, operations will be described. When performing CVD process, the lamps 22 are lit, and the susceptor 8 is heated by the radiant heat of the lamps. Since the susceptor 8 is heated, the wafer 1 placed on the susceptor 8 is heated.

During this process, output from the photodiode 18 is entered into the computing section 26. The output control section 28 supplies a power to the lamps 22 so that the temperature of the susceptor 8 will take a designated value, and also transmits an output power value to the computing section 26.

When the lamps 22 emit light, the light from the lamps 22 passes through the susceptor 8, and is introduced into the light guide 12, although in a small amount. The computing section 26 has stored information on influence which the output voltage of the photodiode 18 undergoes due to arrival of lamplight emitted by the lamps 22 at the photodiode 18. The information on the influence is kept in storage in the computing section 26 as a function of a power to be entered into the lamps 22.

Method for Finding the Function (First Method)

A first example of how to determine the function will be described with reference to FIG. 2. A graph of FIG. 2 shows changes over time in the output voltage Vpd of the photodiode 18 and the temperature TS of the susceptor 8.

In the time range tA, assume that
(1) a power W supplied to the lamps 22 is stable, and takes a nearly constant value Wi,
(2) the temperature TS of the susceptor 8 takes a stable value Ti, and
(3) the output voltage Vpd of the photodiode 18 is stable, and takes a nearly constant value Vi.

At a point in time at which a time t1 elapsed from this state, the power W supplied to the lamps 22 is reduced to zero. At this instant, the light receiving element 18A receives no light from the lamps 22A. Thus, the output voltage Vpd of the light receiving element 18A rapidly lowers from Vi to Vi–ΔVi. Then, the output voltage Vpd of the light receiving element 18A slowly lowers in accordance with the fall of the temperature TS of the susceptor 8. The temperature TS of the susceptor 8 also slowly lowers after power supply to the lamps 22A is stopped. Hence, a decrease in output voltage ΔVi of the light receiving element 18A at the instant of stoppage of power supply to the lamps 22A corresponds to a contribution of the lamplight included in the output voltage Vi of the light receiving element 18A in the time range tA.

Such a test is conducted under varying conditions to obtain a function ΔV=F (W) expressing the relationship between the power W supplied to the lamps 22 and the voltage drop ΔV (ΔVi). The results of the tests under the different conditions are plotted and shown as a graph in FIG. 3. The graph of FIG. 3 shows the results of the tests in which InGaAs (long) was used as the photodiode 18, a filter was provided at a stage preceding the photodiode 18, and the detection wavelength range of the photodiode 18 was set at about 2.0 to about 2.5 μm. (Setting the detection wavelength range at about 2.0 to about 2.5 μm is advantageous in increasing the accuracy of measurement. This is because, the detection wavelength range departs from the wavelength range with the highest radiant intensity of radiated light from the lamps 22, which is usually comprises halogen lamps (see the explanation for a third embodiment to be described later on).) A horizontal axis of the graph of FIG. 3 shows the ratio of the power W supplied to the lamps 22 from the output control section 28, to the maximum output power of the output control section 28. The function ΔV=F (W) can normally be expressed by a relatively simple equation. In the present embodiment, ΔV could be expressed as a linear function of W.

The computing section 26 storing the above function ΔV=F (W) calculates the temperature TS of the susceptor 8 from the following equation (1) based on data concerned with the output voltage V of the photodiode 18 at a certain point in time, and the power W furnished from the output control section 28 to the computing section 26:

$$TS = G(Vpd - \Delta V) \qquad (1)$$
$$= G(Vpd - F(W))$$

where the function G represents a known relationship between the output voltage V of the photodiode 18 in the absence of stray light incident on the photodiode 18 and the temperature of an object emitting thermal radiant light.

According to the present embodiment, as described above, the temperature of the susceptor can be detected, without cutting a specific wavelength of lamplight with a filter before it arrives at the susceptor. Thus, the temperature of the susceptor can be detected with high accuracy in a broad temperature range. The above embodiment adopts a constitution in which such a filter is not included in the system. However, this constitution is not restrictive. To improve the accuracy of measurement further, a filter may be introduced into the system.

Method for Finding the Function (Second Method)

The above function ΔV=F (W) has been determined based on the data obtained when the power W supplied to the lamps 22 is in a steady state. Thus, when the power W supplied to the lamps 22 varies, i.e., in a transient state, required accuracy may fail to be satisfied, if the temperature TS of the susceptor 8 is calculated based on the above equation TS=G (Vpd−ΔV)=G (Vpd−F (W)). Hence, an explanation will be offered for a method for calculating the influence of stray light, the method applicable when a further increase in measurement accuracy is desired.

Figure 4:
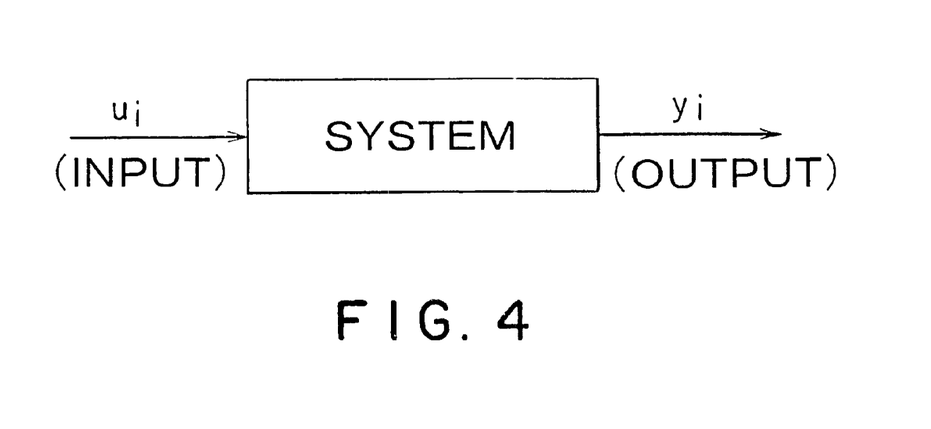
FIG. 4 is a view showing a system assumed in determining other correction function.

A system model as shown in FIG. 4 is considered. In this system, an input $u_i$ is a power W supplied to the lamps 22 at a point in time i, and an output $y_i$ is a contribution of lamplight included in an output voltage $Vr_i$ of the photodiode 18 at the point in time i (i.e., the influence of stray light).

The output $y_i$ at each point in time i is found in the following manner. The actual temperature of the susceptor 8 measured with a thermocouple in contact with the susceptor 8 while the susceptor 8 is being heated with the lamps 22 is designated as TSr. The actual output voltage of the photodiode 18 in response to the actual temperature TSr is designated as Vr. The output voltage of the photodiode 18 in response to the actual temperature TSr of the susceptor 8 in the absence of the influence of stray light is designated as Vb. The relationship between TSr and Vb can be obtained from specifications provided by the manufacturer of the photodiode 18, or by conducting experiments in an environment free from the influence of stray light. Vr−Vb at each point in time i is the output $y_i$ of this system.

The relationship between the input to and the output from the system is approximately expressed by a difference equation using the ARX model, as follows:

$$y_1 = \sum_{i=1}^{N+1} b_i u_i - \sum_{i=1}^{N} a_{i+1} y_{i+1} \tag{2}$$

In Equation (2), i=1 represents the present point in time, and a greater i represents a more past point in time. $b_i$ and $a_i$ denote constants determined based on the results of measurement of $y_i$ and $u_i$ at a plurality of points in time, i. N is a natural number of 2 or more. In Equation (2), a mathematical method, such as the method of least squares, can be used in determining these constants.

From Equation (2), therefore, the output $y_i$ at the present point in time can be expressed by $$\begin{aligned} y_1 &= \sum_{i=1}^{N+1} b_i u_i - \sum_{i=1}^{N} a_{i+1} y_{i+1} \\ &= b_1 u_1 + b_2 u_2 + \cdots + b_{n+1} u_{N+1} \cdots - a_z y_z - a_3 y_3 - \cdots - a_{N+1} y_{nN+1} \end{aligned} \tag{3}$$

These constants can also be determined based on the results of measurement made in the entire temperature region of the object to be measured. More preferably, however, they are determined based on the results of measurement of $u_i$ and $y_i$ in a temperature region for which the highest accuracy of measurement is desired. For example, when it is desired to increase the accuracy of measurement during a temperature rise in a temperature range of 200 to 300° C., temperature raising using the lamps 22 is started in a state in which the actual temperature of the susceptor 8 is slightly lower than 200° C., and heating with the lamps 22 is continued until the actual temperature of the susceptor 8 becomes slightly higher than 300° C. During this period, data on $u_i$ and $y_i$ are taken at predetermined intervals of time. The constants $b_i$ and $a_i$ are determined using the data obtained during this period.

After the constants $b_i$ and $a_i$ are determined in the above manner, F (W) of the aforementioned Equation (1), i.e., TS=G(Vpd−F (W)), is substituted by $y_i$ of Equation (2), whereby an equation for finding the temperature of the susceptor 8 can be obtained.

Next, an explanation will be offered for the results of comparison between the method of finding the function for calculating the contribution of stray light from the lamps in disregard of the transient characteristics (first method) and the method of finding the function for calculating the contribution of stray light from the lamps in consideration of the transient characteristics (second method).

Figure 5:
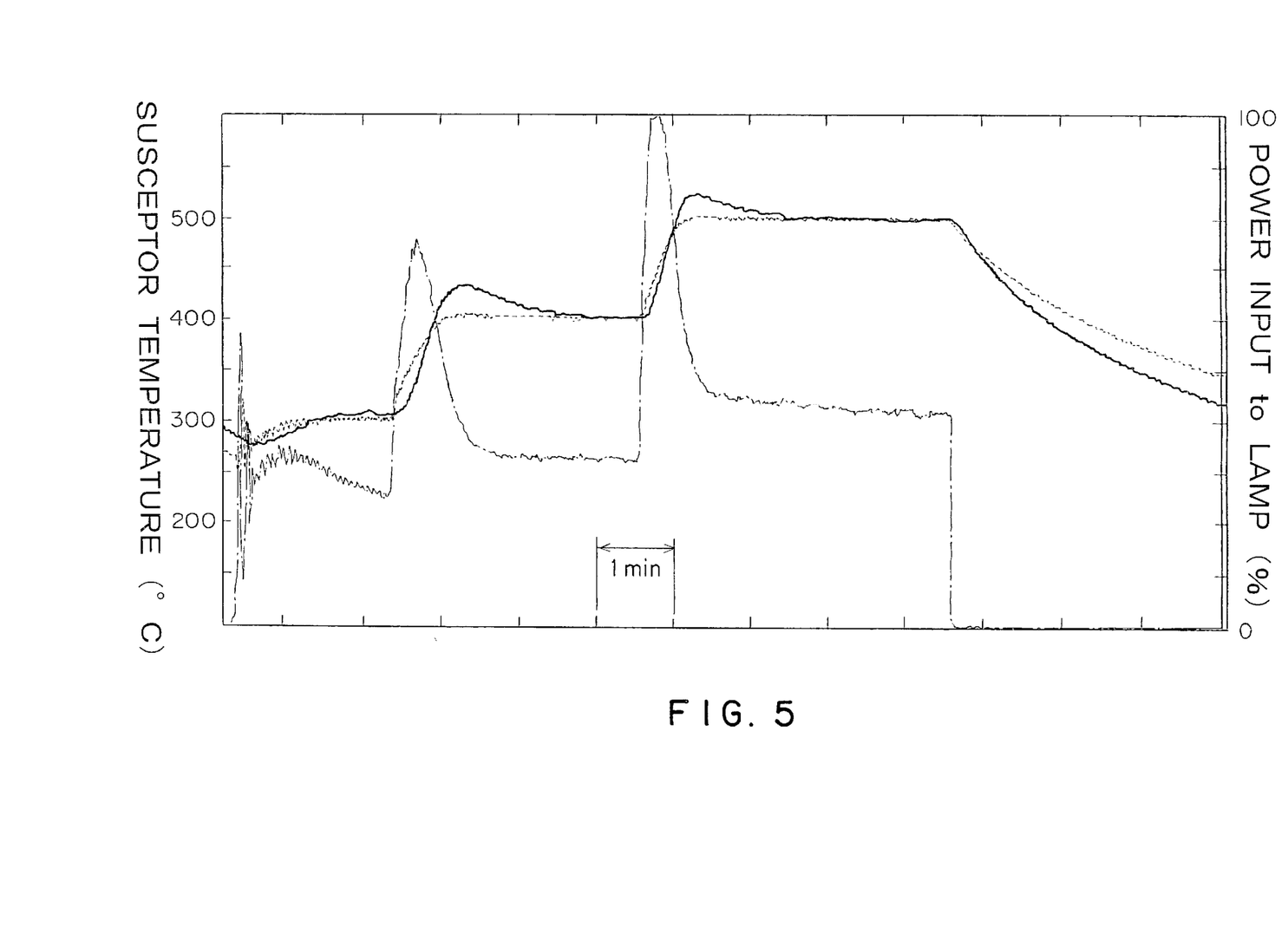
FIG. 5 is a graph showing the results of temperature control performed using a correction function determined by a first method.
Figure 6:
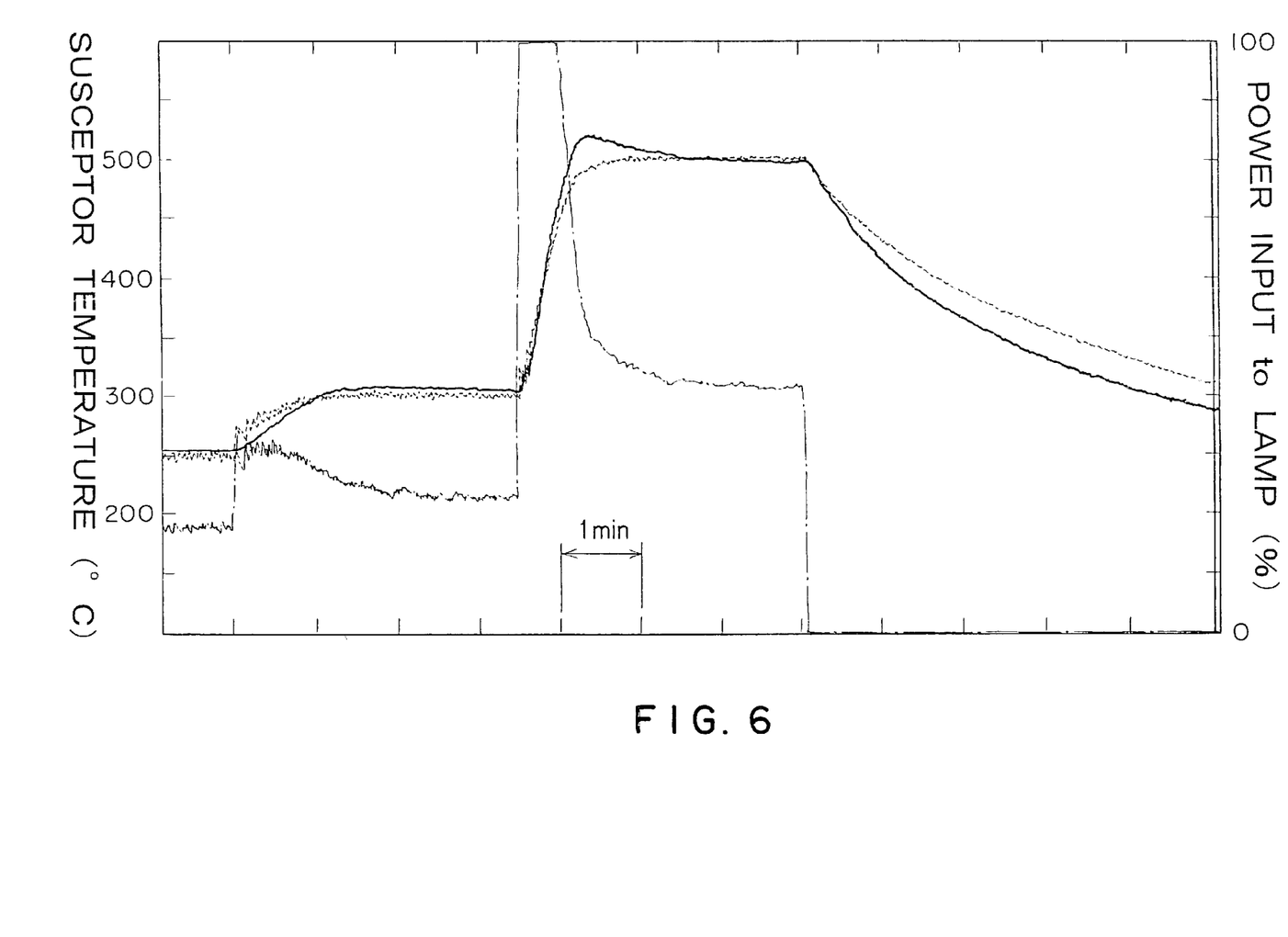
FIG. 6 is a graph showing the results of temperature control performed using a correction function determined by a second method.

FIGS. 5 and 6 show the relationship among the output of the lamps 22, the actual temperature of the susceptor 8 (measured with a thermocouple), and the temperature of the susceptor 8 calculated by the computing section. FIG. 5 shows the results of calculation of the temperature of the susceptor 8 by the computing section 26 based on the function found by the first method, while FIG. 6 shows the results of calculation of the temperature of the susceptor 8 by the computing section 26 based on the function found by the second method. In FIGS. 5 and 6, a solid line represents the actual temperature of the susceptor 8 measured with a thermocouple, a dashed line represents the temperature of the susceptor 8 calculated by the computing section 26 based on the detection values of the photodiode 18, and a one-dot chain line represents a lamp output W (expressed as a percentage of the full power as 100). FIG. 5 shows the results of repeated cycles of treatments, with each cycle being such that the susceptor 8 was "held at 300° C. for a predetermined time→heated to 300° C. and held for a predetermined→time heated to 400° C. and held for a predetermined time→heated to 500° C. and held for a predetermined time→cooled to 300° C. by natural cooling and held at 300° C. for a predetermined time". FIG. 6 shows the results of repeated cycles of treatments, with each cycle being such that the susceptor 8 was "held at 250° C. for a predetermined time→heated to 300° C. and held for a predetermined time→heated to 500° C. and held for a predetermined time→cooled to 250° C. by natural cooling and held at 250° C. for a predetermined time". The conditions are slightly different between FIG. 5 and FIG. 6, but the inventor thinks that the data indicated in these drawings are sufficiently meaningful in evaluating whether the present system can properly respond to transient temperature changes.

A comparison of FIGS. 5 and 6 shows that both are greatly different during the period in which after the susceptor 8 was cooled from 500° C. to 300° C. (250° C.), the susceptor 8 was held at this temperature for a predetermined time. That is, in FIG. 5, the actual temperature of the susceptor 8 was not stable at 250° C., and the lamp power W also violently fluctuated. In FIG. 6, by contrast, the actual temperature of the susceptor 8 was stable, and the lamp power W was also stable.

In the temperature raising processes as well, FIG. 6, compared with FIG. 5, shows that the actual temperature of the susceptor 8 measured with the thermocouple, and the temperature of the susceptor 8 calculated by the computing section 26 based on the detection values of the photodiode 18 were close to each other, meaning small measurement errors.

Second Embodiment

Figure 7:
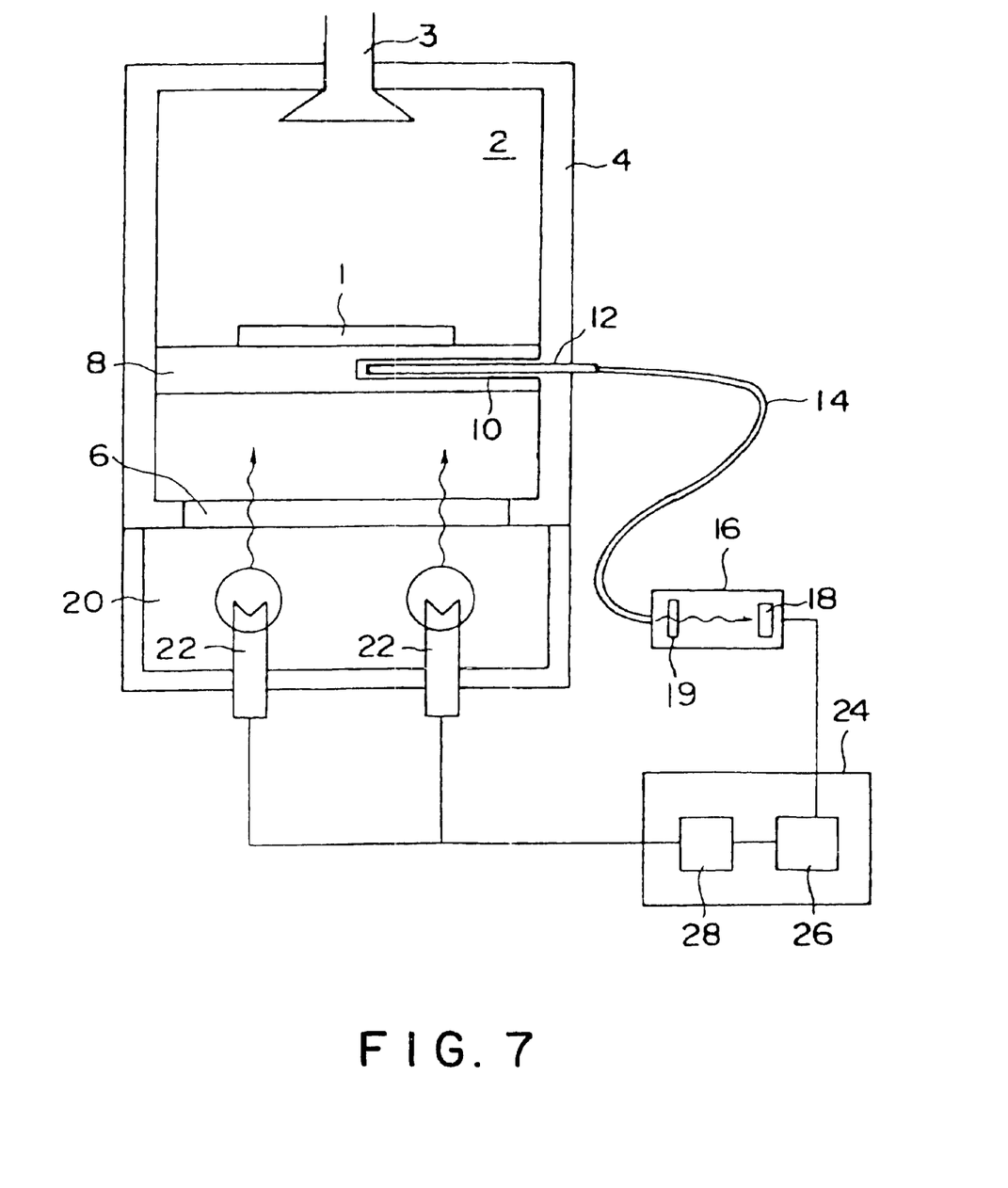
FIG. 7 is a view schematically showing the constitution of a CVD treating apparatus equipped with a temperature measuring system according to a second embodiment of the present invention.
Figure 8:
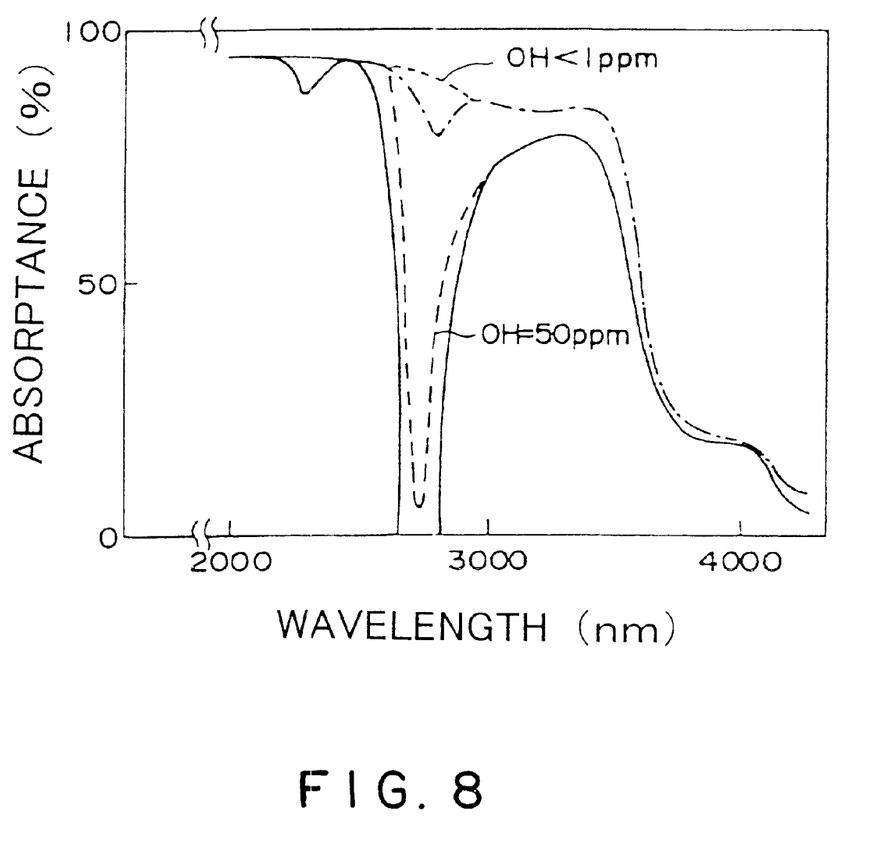
FIG. 8 is a graph illustrating the wavelength dependency of the light transmittance of quartz glass with respect to the content of hydroxyl groups.

Next, a second embodiment will be described with reference to FIGS. 7 and 8.

The second embodiment is different from the first embodiment in that (1) a window (window material) 6 is composed of quartz glass containing hydroxyl groups, and the window (window material) 6 itself has a filtering function for a specific wavelength region, and that (2) the constitution of the photodetector side is partially changed accordingly. The other constitution is nearly the same as in the first embodiment. In the second embodiment, members having the same functions as, or similar functions to, the functions in the first embodiment are assigned the same numerals, and duplicate explanations are omitted.

A window or window material 6 provided at the bottom of a wall body 4 is composed of quartz glass containing hydroxyl groups. Quartz glass containing hydroxyl groups has an absorption band around 2700 nm (2.7 $\mu$m) due to vibrations of O—H, the intensity of the absorption being proportional to the concentration of the hydroxyl groups. Quartz glass containing hydroxyl groups also has an absorption band around 2200 nm because of vibrations of Si—O—H, but the absorption performance in this absorption band is considerably less than that in the absorption band around 2700 nm. FIG. 2 is a graph showing the wavelength dependency of the light transmittance of 1 cm thick quartz glass with respect to the concentration of hydroxyl groups (quoted from "World of Quartz Glass", S. Kuzuo, Kogyo Chosakai Publishing Co., Ltd. (1996)). As will be understandable from this graph, 90% or more of 2700 nm wavelength light is absorbed in the presence of a hydroxyl group concentration of 50 ppm (see a dashed line in FIG. 2). Thus, in practicing the present invention, it is preferred to use quartz glass having a hydroxyl group concentration of 50 ppm or more as the window material 6. The quartz glass may be that produced by the melting method, synthetic quartz glass, or that produced by the VAD method.

By using quartz glass containing a suitable amount of hydroxyl groups as the window material 6, a means for selectively transparent to lights of wavelengths beyond (out of) a wavelength range close to 2700 nm, i.e., a specific wavelength range can be constituted. (If the wording "specific wavelength range" is used to mean a wavelength range beyond a wavelength range close to the wavelength of 2700 nm, the above passage can be expressed as follows: "a means for selectively transparent to lights of wavelengths within a wavelength range close to a wavelength of 2700 nm, i.e., lights of wavelengths within a specific wavelength range".)

In a photodetector 16, an optical filter 19 is provided ahead of a light receiving element 18. By combining, the light receiving element 18 having suitable photosensitivity characteristics (meaning the wavelength dependency of photosensitivity) and the optical filter 19 having suitable transmission characteristics (meaning the wavelength dependency of transmittance), a photodetection means for selectively detecting lights of wavelengths within a wavelength range close to 2700 nm (i.e., lights of wavelengths close to a specific wavelength range) is obtained. (If the wording "specific wavelength range" is used to mean a wavelength range beyond a wavelength range close to 2700 nm, the above passage can be expressed as follows: "a photodetection means selectively detecting lights of wavelengths within a wavelength range close to 2700 nm i.e., lights of wavelengths within a wavelength range beyond a specific wavelength range is obtained".)

In the present embodiment, a thermopile using Sb and Bi (antimony and bismuth) is used as the light receiving element 18, and a multilayer interference filter is used as the optical filter 19 to constitute photodetection means for selectively detecting lights of wavelengths within a wavelength range close to 2700 nm.

Next, operations will be described. Lights radiated from lamps 22 within a wavelength range close to 2700 nm (i.e., a specific wavelength range) are absorbed by the window material 6, and lights beyond the specific wavelength range arrive at a susceptor 8. Lamplight that has arrived at the susceptor 8 heats the susceptor 8, and is also introduced, although in a small amount, into a light guide 12 after passing through the susceptor 8.

Thus, the light introduced into the light guide 12 is a combination of radiant light from the susceptor 8, and lamplight having the wavelength range close to 2700 nm cut off. At a stage preceding the light receiving element 18, the optical filter 19 is provided. Of the light introduced into the light guide 12, therefore, only the wavelength range close to 2700 nm arrives at the light receiving element 18. That is, lamplight does not reach, or scarcely reaches, the light receiving element 18. Hence, the influence of stray light from the lamps 22 can be excluded from the output of the light receiving element 18, so that the temperature of the susceptor 8 can be measured precisely.

A computing section 26 and an output control section of a temperature controller 24 act similarly to the first embodiment. Needless to say, the function stored in the computing section 26 is that determined by conducting a test in the apparatus having the constitution of the present embodiment.

As described above, in the present embodiment, means for optically excluding the influence of lamplight is provided in addition to the characterizing portion of the first embodiment. Thus, the accuracy of temperature measurement can be further increased.

Furthermore, the material constituting the window, itself, has a filtering function, so that there is no need to provide a filter separately from the window. Thus, the constitution of the entire apparatus can be simplified.

In the above-described embodiment, the combination of the light receiving element 18 and the optical filter 19 constitutes the photodetection means for selectively detecting light in a wavelength range close to 2700 nm. However, if the photosensitivity characteristics of the light receiving element 18 are sufficient to attain the object of selectively detecting light in the vicinity of a specific wavelength range, it is possible to constitute the photodetection means without the optical filter 19. Moreover, a suitable photodiode, if any, as the light receiving element 18 may be used instead of the thermopile.

Third Embodiment

Figure 9:
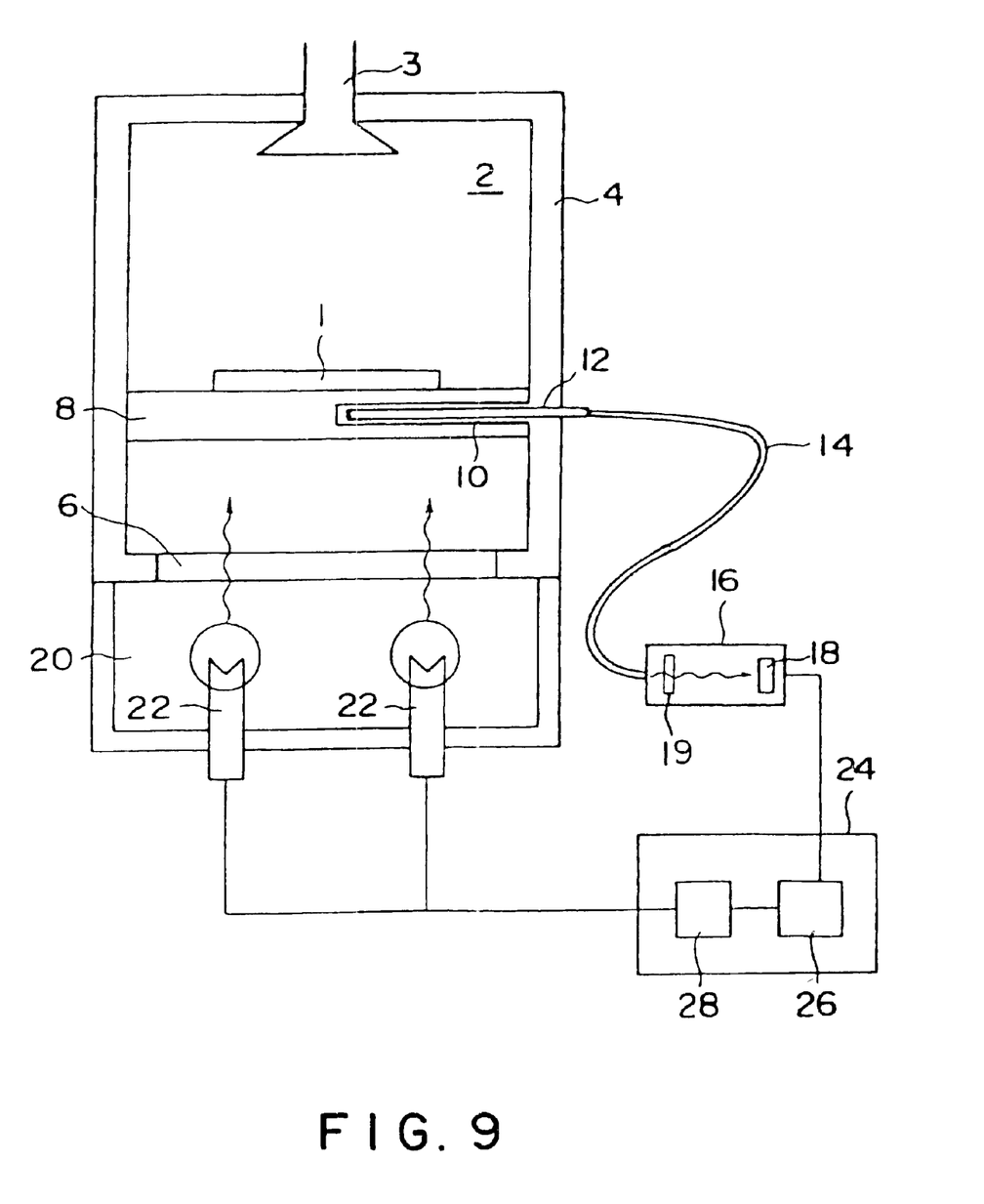
FIG. 9 is a view schematically showing the constitution of a CVD treating apparatus equipped with a temperature measuring system according to a third embodiment of the present invention.
Figure 10:
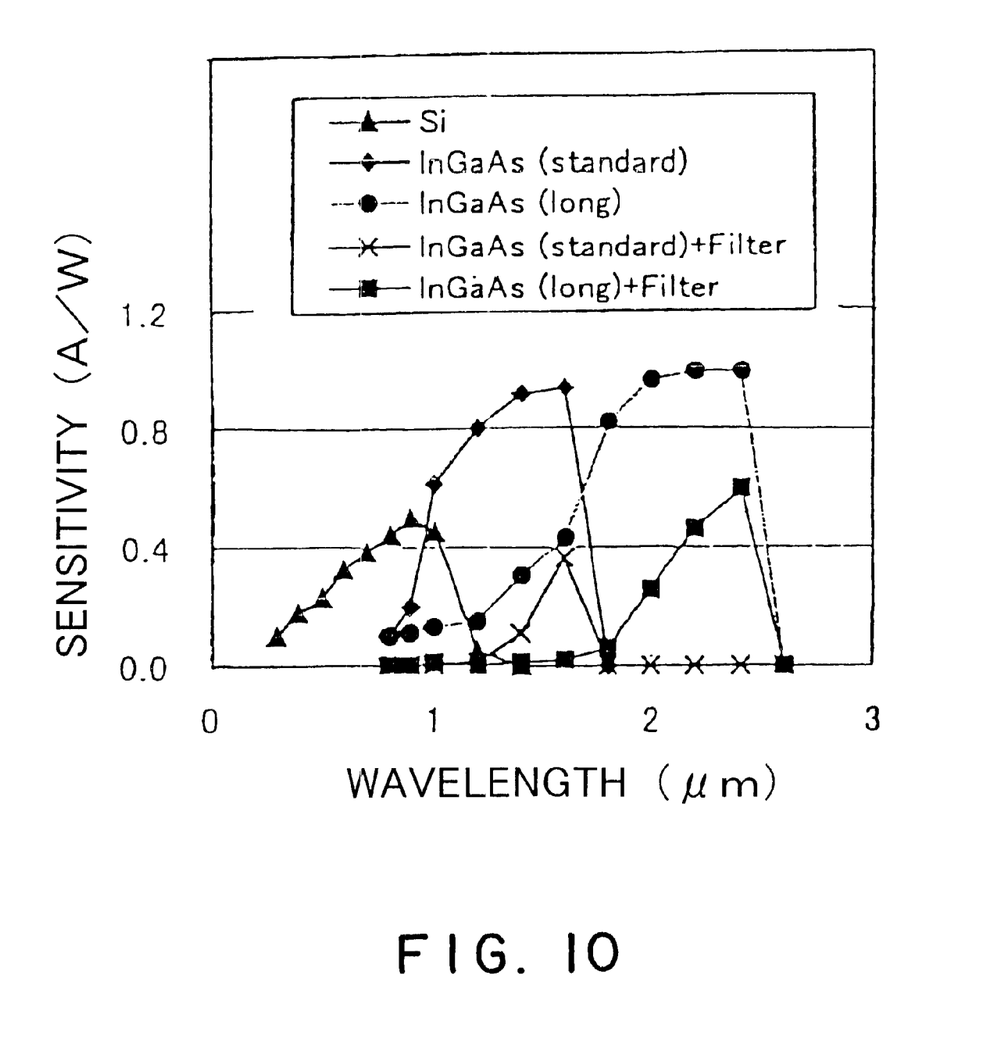
FIG. 10 is a graph showing detection wavelength regions for combinations of light receiving elements and an optical filter used in experiments.

Next, a third embodiment will be described with reference to FIGS. 9 to 11.

The third embodiment is different from the first embodiment in that the wavelength to be detected by a photodetector 16 is restricted to a predetermined wavelength or longer. The other constitution is essentially the same as in the first embodiment. In the third embodiment, members having the same functions as, or similar functions to, the functions in the first embodiment are assigned the same numerals, and duplicate explanations are omitted.

In a photodetector 16, an optical filter 19 is provided ahead of a light receiving element 18. By combining the light receiving element 18 having suitable photosensitivity characteristics (meaning the wavelength dependency of photosensitivity) and the optical filter 19 having suitable transmission characteristics (meaning the wavelength dependency of transmittance), there can be constituted photodetection means for selectively detecting light in a desired wavelength range. In the present embodiment, the photodetection means is adapted to selectively detect lights of a wavelengths which are a predetermined wavelength or longer. The detection wavelength range by the photodetection means will be described later on in detail.

Next, operations will be described. Light radiated from lamps 22 reaches a susceptor 8. Lamplight that has arrived at the susceptor 8 heats the susceptor 8, and is also introduced, although in a small amount, into a light guide 12 after passing through the susceptor 8. Thus, the light introduced into the light guide 12 is a combination of radiant light from the susceptor 8, and lamplight.

A computing section 26 and an output control section of a temperature controller 24 operates similarly to the first embodiment. Needless to say, the function stored in the computing section 26 is that determined by conducting a test in the apparatus having the constitution of the present embodiment.

Advantages produced by constituting the photodetection means so as to selectively detect lights of wavelengths, which are a predetermined wavelength or longer, will be described below.

The influence of lamplight on the results of temperature measurement because of the incorporation of the lamplight into the light introduced into the light guide 12 can be found by the method described in the first embodiment (see FIG. 2 again).

The values of Vi and (Vi−ΔVi) are obtained by the same method as in the first embodiment, with the detection wavelength being varied. R=Vi/(Vi−ΔVi) is defined as the intensity ratio index of radiated light from the lamplight 22 with respect to radiant light from the susceptor 8. This intensity ratio index R can be expressed as a function of the detection wavelength region by the photodetection means. The relevant relationship is shown in Table 1.

TABLE 1

| Wavelength (μm) | Lamp/susceptor radiant intensity ratio index R |
|---|---|
| 0.5–1.0 | 100.00 |
| 1.0–1.5 | 20.00 |
| 1.5–2.0 | 0.70 |
| 2.0–2.5 | 0.10 |
| 2.5–3.0 | 0.05 |
| 3.0–3.5 | 0.01 |

As Table 1 shows, the intensity ratio index R is 1 or less when the detection wavelength region is 1.5 μm or more, and the intensity ratio index R is 0.1 or less when the detection wavelength region is 2.0 μm or more. That is, a marked improvement is observed in comparison with the detection wavelength region of less than 1.5 μm.

In the present embodiment, the detection wavelength by the photodetector 16 is restricted to a predetermined value or more (preferably 1.5 μm or more, more preferably 2.0 μm or more) based on the above findings.

EXAMPLE

Next, the present invention will be described in further detail on the basis of an experimental example. The intensity ratio index R was investigated, with the detection wavelength range being varied by suitably combining the light receiving element 18 and the filter 19. The results are shown in Table 2. FIG. 10 shows the detection wavelength regions for combinations of the light receiving element 18 and the filter 19 used in the test conducted to obtain the results of Table 2. In Table 2 and FIG. 10, the lack of the indication "Filter" represents that the photodetection means was constituted only from the light receiving element 18 without provision of the filter 19.

TABLE 2

Lamp/susceptor radiant intensity ratio index R

| Susceptor temperature | Lamp output (%) | IngaAs (L) + Filter | IngaAs (S) + Filter | IngaAs (S) | Si |
|---|---|---|---|---|---|
| 150° C. | 10 | R = 5.7 | | | |
| 200° C. | 13 | 2.3 | | | |
| 250° C. | 16 | 1.2 | | | |
| 300° C. | 15 | 0.58 | R = 6.2 | R = 8.1 | |
| 350° C. | 18 | 0.27 | 2.5 | 4.1 | |
| 400° C. | 21 | 0.15 | 1.5 | 1.7 | R = 370 |
| 450° C. | 27 | 0.10 | 0.74 | 1.3 | 100 |
| 500° C. | 32 | 0.067 | 0.45 | 0.70 | 56.9 |
| 520° C. | 35 | 0.058 | 0.33 | 0.55 | 31.8 |

As Table 2 shows, when InGaAs (long) as the light receiving element 18 and the filter 19 that cuts the short wavelength side at 1.5 μm or less were combined, measurement errors could be decreased. Particularly when the temperature of the susceptor 8 was about 500° C., the measurement error was very small.

As noted above, considering the relationship between the energy distribution of radiated light from a halogen lamp (hereinafter referred to as "lamplight") usually having a color temperature of 2,000° C. to 3,000° C. and the energy distribution of radiant light from the susceptor based on the temperature of the susceptor (normally, 300° C.–600° C.) during the film forming step, the detection wavelength region is excluded from the wavelength region in which the energy of lamplight is the most intense. Thereby, even when lamplight is incident on the light receiving element as stray light, the influence of the stray light can be minimized.

Figure 11:
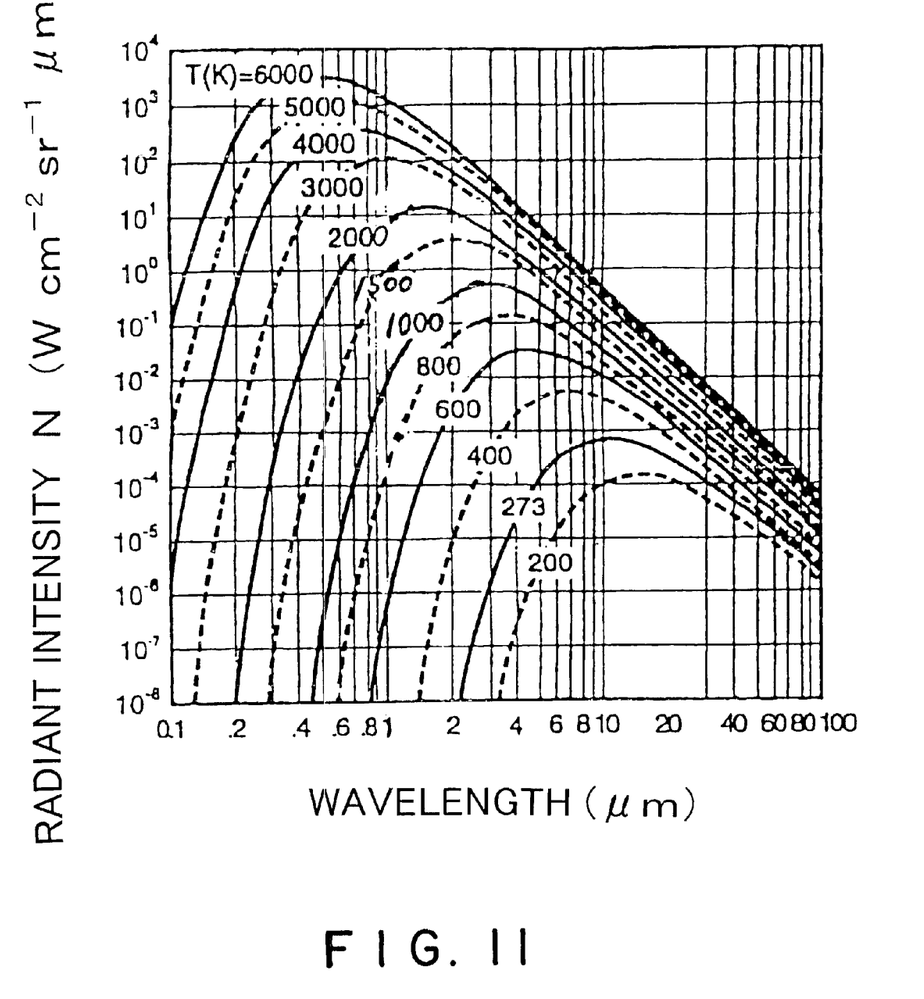
FIG. 11 is a view showing the radiant intensity distributions, at various temperatures, of radiant light radiated from an object.
Figure 12:
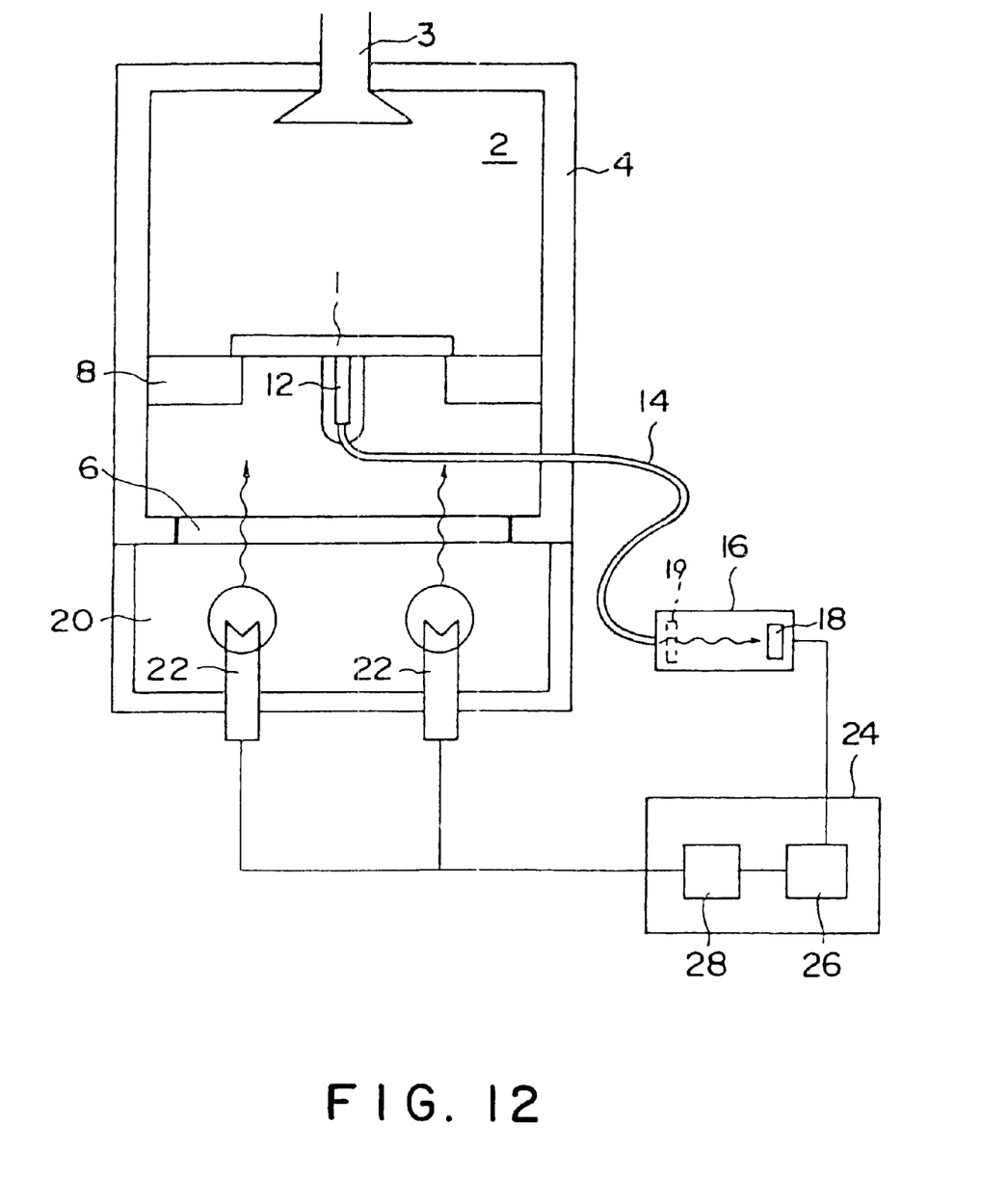
FIG. 12 is a view schematically showing another example of a CVD treating apparatus equipped with a temperature measuring system according to the present invention.

That is, as shown in FIG. 11, the energy of halogen lamp light is the strongest in the range of the wavelengths 0.5 to 1.0 μm. This wavelength range is excluded from the detection wavelength range, whereby the influence of stray light can be minimized. Moreover, a range of the wavelengths 1.5 to 6 μm, which is outside the wavelength range of 0.5 to 1.0 μm and in which the energy of radiant light from the susceptor 8 normally set in the range of 300° C. to 600° C. is the strongest, is selected as the detection wavelength range, whereby the influence of stray light can be suppressed further. As stated earlier, the detection wavelength range is preferably 1.5 μm or more, and more preferably 2.0 μm or more.

In the present embodiment, as described above, the characterizing portion of the first embodiment is provided, and in addition, the detection wavelength range by the photodetection means is optimized. Thus, the accuracy of temperature measurement can be improved further.

In the above-described embodiment, the combination of the light receiving element 18 and the optical filter 19 constitutes the photodetection means for selectively detecting light in a predetermined wavelength range. However, if the photosensitivity characteristics of the light receiving element 18 are sufficient to attain the object of selectively detecting light in the vicinity of a specific wavelength range, it is possible to constitute the photodetection means without the optical filter 19.

Modified Example

In the foregoing first to third embodiments, the object of temperature measurement was the susceptor 8 on which the wafer 1 as a material to be processed is placed. However, the application of the present invention is not restricted thereto. That is, as shown in FIG. 9, for example, there may be a configuration in which the light guide 12 detects radiant light from the wafer 1 as the material to be processed. Furthermore, there may be a configuration in which the light guide 12 is disposed above or obliquely above the wafer 1, and apart from the wafer 1, in the chamber 2, and the light guide 12 detects radiant light from the wafer 1. In this case as well, practically the same effects as in the above-mentioned embodiments are obtained.

What is claimed is:

1. A temperature measuring system for performing temperature measurement of an object to be measured, the object housed in a chamber to be heated by a lamp heating source, said system comprising:

a photodetector that detects thermal radiant light from the object to be measured; and a computing section that calculates a temperature of the object to be measured, based on an output value of the photodetector, wherein an influence exerted on the output value of the photodetector, due to arrival of the light emitted by the lamp heating source at the photo detector, is stored in the computing section as a function of an input power into the lamp heating source, wherein the computing section corrects the output value of the photodetector based on the function, and determines the temperature of the object, based on the corrected value, and wherein the function stored in the computing section is expressed by the following equation $$y_i = \sum_{i=1}^{N+1} b_i u_i - \sum_{i=1}^{N} a_{i+1} y_{i+1}$$

where:

$y_i$ is the influence exerted on the output value of the photodetector, at a point in time i, because rays emitted by the lamp heating source arrive at the photodetector, $u_i$ is the input power into the lamp heating source at the point in time i, $a_i$ and $b_i$ are constants determined based on results of measurement of $y_i$ and $u_i$ at a plurality of the points in time i, i=1 represents a present point in time, and N is a natural number of 2 or more.

2. The temperature measuring system according to claim 1 further comprising:

a light guide, arranged in the chamber, that transmits the thermal radiant lights from the object; and an optical transmission medium that guides the lights obtained by the light guide to the photodetector.

3. The temperature measuring system according to any one of claims 1 or 2, further comprising a window material arranged between the lamp heating source and the object, the window material selectively transmissive to light of wavelengths beyond a specific wavelength range, wherein the photodetector selectively detects light of wavelengths in a wavelength range close to and including the specific wavelength range.

4. The temperature measuring system according to any one of claims 1 or 2, wherein the photodetector is adapted to selectively detect lights of wavelengths of 1.5 $\mu$m or more.

5. The temperature measuring system according to claim 3, further comprising an optical filter that restricts a wavelength range of lights incident on a light emitting element of the photodetector.

6. The temperature measuring system of claim 4, further comprising an optical filter that restricts a wavelength range of lights incident on a light emitting element of the photodetector.

* * * * *